Aug. 5, 1952   J. M. PEARSON   2,605,638
FLOWMETER
Filed April 13, 1946
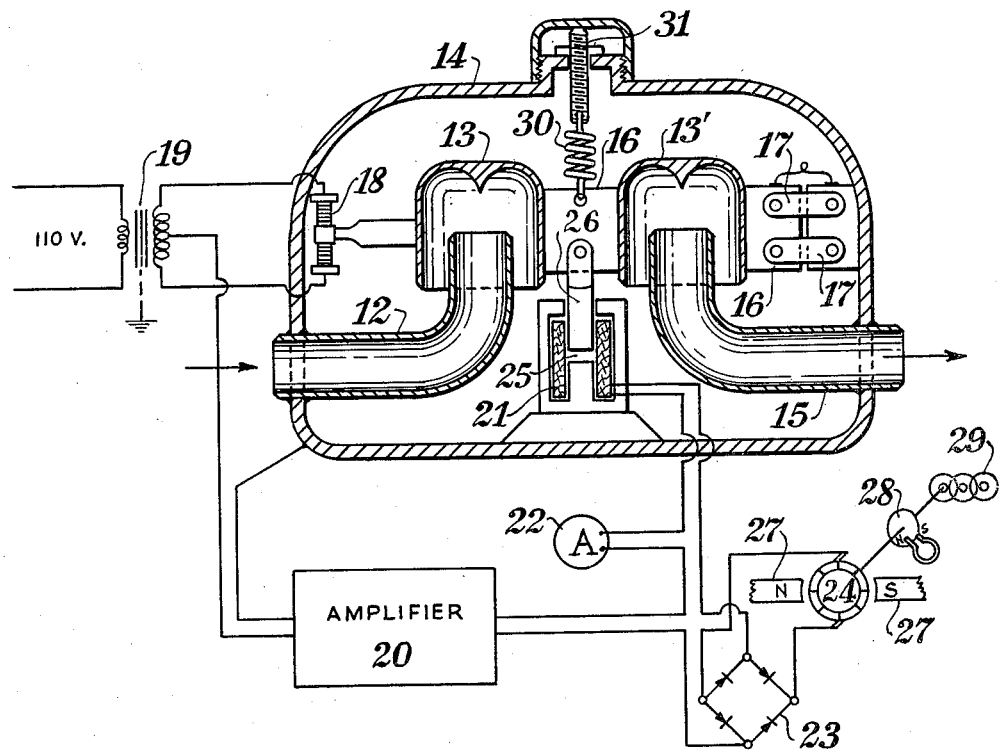
INVENTOR.
John M. Pearson
BY
Busser and Harding
ATTORNEYS Patented Aug. 5, 1952

2,605,638

UNITED STATES PATENT OFFICE 2,605,638

FLOWMETER

John M. Pearson, Swarthmore, Pa., assignor to Sun Oil Company, Philadelphia, Pa., a corporation of New Jersey Application April 13, 1946, Serial No. 661,943

2 Claims. (Cl. 73—228)

The present invention relates to the measurement of fluid flow.

An object of the invention is to provide a device for measuring fluid flow, which is independent of the nature of the flow, by observing the momentum per second of the fluid which passes a given point in a conduit. Thus, an object of the invention is the provision of a device which is operative with excellent accuracy to measure fluid flow whether or not said flow is streamline or turbulent. Further, it is an object of the invention to provide a device for fluid flow measurement which is independent of the viscosity of the fluid the flow of which is to be measured.

According to the invention, use is made of the momentum of a flowing fluid to measure its rate of flow by causing a change in said momentum to produce a reaction upon provided measuring means hereinafter described and claimed.

According to the invention there is provided a device for the measurement of fluid flow which operates upon a fluid to cause a change in its momentum and measuring the change in momentum thus produced.

Otherwise stated, there is provided, according to the invention, a device for the measurement of fluid flow which comprises means to divert a flowing fluid from its path of flow and measure the change in its momentum. Still, otherwise stated, the apparatus of the invention comprises means to divert a flowing fluid from its path of flow and cause the change of momentum of the fluid thus produced to actuate means adapted to measure or indicate the extent of said change.

As shown in the drawing, which is a cross-sectional elevation of the device embodied in the invention, a flowing fluid fed through conduit 12 is discharged into cup 13 and thence into pressure vessel 14. The fluid then enters cup 13' finally leaving the apparatus through conduit 15. The sizes of cups 13 and 13' can be such that the momentum of the fluid entering into each cup, respectively, will equal the momentum of the fluid leaving each cup. The reversal of momentum produced in cups 13 and 13' produces a reaction tending to displace said cups in an upwardly direction. This reaction is only partially balanced by the force caused by the difference in static pressure between the inside and outside of the cups 13 and 13' which arises by reason of the Bernoulli effect. The additional force necessary will be supplied by the solenoid 25 as will be described below. If the cross sectional area of the pressure vessel 14 is very large the upward reaction of the cups will be only about half compensated by static pressure difference. Thus, the upward reaction produced in the cups is about one half compensated for by Bernouilli effect. The reaction on the cups varies as the square of the flow rate times the density of the fluid.

Means for the measurement of the reaction or change of momentum as a measurement or indication of the rate of fluid flow is illustrated. Thus cups 13 and 13' are mounted on arm (16) hinged or linked at 17 in such manner that arm (16) will move vertically without deviating from the horizontal. At the other extremity of arm (16) there is a push pull carbon pile 18, or its equivalent, fed by shielded transformer 19. As the arm (16) tends to move up and down, about hinge or link 17, a signal proportional to the reaction on pile 18 is fed to linear amplifier 20 which produces A. C. current in solenoid 21, ammeter 22, amperehour meter rectifier 23 and armature 24, all in series. Solenoid 21 produces a flux in gap 25 producing a pull on armature 26 proportional to the square of the current I, indicated at ammeter 22, tending to restore arm (16) to its original position. Because of the square law the current required in coil 21 is proportional directly to the fluid flow rate and the current flowing at any time is an indication or measure of the rate of fluid flow. Amperehour meter armature 24 in permanent field 27 rotates at speed proportional to current, by means of damping disc 28, causing register 29 to integrate flow through the apparatus. Ammeter 22 may be calibrated to give directly the rate of flow. A zero adjustment is provided by spring 30 and adjusting screw 31. Enclosure of reaction cups 13 and 13' in pressure vessel 14 and symmetrical disposal of inlet and outlets reduces static pressure and friction errors.

As used herein and in the appended claims, the term "fluid" includes gases, vapors, liquids and all other substances having the properties of flowing fluids.

From the foregoing description it is obvious that the measurement of flow is accomplished by a measurement of momentum change, or the resulting reaction, as distinguished from metering of volumes (displacement meters) and metering of energy change (Venturi meters) based on the energy of the stream in accordance with Bernouilli's theorem.

It will be obvious to those skilled in the art that the flow meter can be provided with a by-pass pipe so that only a portion of the fluid, the flow of which is to be measured, will pass therethrough. However, it is to be noted that the entire fluid passing through the operative portion, tube, cup or other equivalent means, of the flowmeter is acted on to cause a change in its momentum and that this is the change of momentum measured.

I claim:

1. A device for measuring the rate of fluid flow in a conduit comprising in combination a sealed housing adapted to contain a volume of the fluid to be measured, a flow deflecting surface within said housing including a pair of adjacent inverted cups, means providing a passage for fluid flow through said housing having an inlet positioned to direct fluid flow into one of said cups and an outlet to direct the fluid flow from the second cup, an arm supporting said cups in spaced relation, a parallel linkage coupling one end of said arm to the interior of said housing to maintain the cups in a horizontal position under all flow conditions, a variable electrical resistance operated by the free end of said support arm, a solenoid core attached to said support arm, an electrical coil embracing said core, and electrical means to connect said variable resistance and the solenoid coil whereby the quantity of electricity flowing through the solenoid coil to restore equilibrium of the supporting arm is a measure of the fluid flow.

2. A device for measuring the rate of fluid flow in a conduit comprising in combination a sealed housing adapted to contain a volume of the fluid to be measured, a flow deflecting surface within said housing including a pair of adjacent inverted cups, means providing a passage having an inlet extending into one of said cups and an outlet extending from the second cup for the flow of fluid through said housing, an arm supporting said cups in spaced relation, a parallel linkage coupling one end of said arm to the interior of said housing to maintain the cups in a horizontal position under all flow conditions, electrically operated means to measure the fluid flow in terms of the deflection of said cups including a movable resistance current control in operating engagement with the supporting arm, an amplifier coupled to said resistance, a restoring solenoid mechanically attached to said arm and electrically coupled to said amplifier, a meter in series with said solenoid to indicate instantaneous electrical demands, and a registering means in series with the amplifier and said meter to total the measured fluid flow for determined periods.

JOHN M. PEARSON.

REFERENCES CITED

The following references are of record in the file of this patent:

UNITED STATES PATENTS

| Number | Name | Date |
|---|---|---|
| 1,401,299 | Wohlenberg | Dec. 27, 1921 |
| 1,479,663 | Herz | Jan. 1, 1924 |
| 1,581,957 | Keller | Apr. 20, 1926 |
| 1,953,819 | Payne | Apr. 3, 1934 |
| 2,319,363 | Wunsch et al. | May 18, 1943 |
| 2,383,757 | Ziebolz | Aug. 28, 1945 |

FOREIGN PATENTS

| Number | Country | Date |
|---|---|---|
| 215,355 | Germany | Oct. 26, 1909 |
| 369,588 | Great Britain | Mar. 21, 1932 |